(12) United States Patent
Majewicz

(10) Patent No.: US 8,649,076 B2
(45) Date of Patent: Feb. 11, 2014

(54) CALIBRATING FIELD UNIFORMITY

(75) Inventor: Peter Majewicz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1080 days.

(21) Appl. No.: 12/512,934

(22) Filed: Jul. 30, 2009

(65) Prior Publication Data

US 2011/0026087 A1    Feb. 3, 2011

(51) Int. Cl.
  *H04N 1/46* (2006.01)
  *H04N 1/04* (2006.01)
  *G06F 3/12* (2006.01)
  *G03F 3/08* (2006.01)
  *H04N 1/40* (2006.01)
  *G06T 5/00* (2006.01)
  *H04N 1/60* (2006.01)
  *G06K 15/00* (2006.01)
  *G09G 3/10* (2006.01)
  *H04N 3/14* (2006.01)
  *G06K 9/00* (2006.01)

(52) U.S. Cl.
  USPC ............ 358/509; 358/474; 358/1.1; 358/518; 358/448; 358/3.26; 358/1.9; 358/1.18; 358/3.27; 358/504; 358/523; 315/169.3; 348/302; 382/154; 382/164; 382/118; 382/167

(58) Field of Classification Search
  USPC .............. 358/509, 474, 1.1, 518, 1.9, 1.18; 382/164, 154; 356/243.5, 446; 359/198.1
  See application file for complete search history.

(56) References Cited

U.S. PATENT DOCUMENTS

| | | | |
|---|---|---|---|
| 4,795,254 A * | 1/1989 | Kravetz | 356/243.5 |
| 6,934,053 B1 * | 8/2005 | Mestha et al. | 358/1.9 |
| 6,991,158 B2 | 1/2006 | Munte | |
| 7,655,936 B2 * | 2/2010 | Sawayama et al. | 250/559.4 |
| 2008/0030787 A1 * | 2/2008 | McElvain | 358/3.26 |
| 2008/0079956 A1 | 4/2008 | Chelvayohan et al. | |
| 2009/0059316 A1 | 3/2009 | Irwin, Jr. et al. | |
| 2010/0097678 A1 * | 4/2010 | Hajjar et al. | 359/198.1 |

\* cited by examiner

*Primary Examiner* — Charlotte M Baker
*Assistant Examiner* — Rury Grisham

(57) ABSTRACT

Systems and methods systems and methods for calibrating field uniformity are disclosed. An exemplary method includes scanning the imaging area including a first media to obtain optical data for a specular reflectance map. The method also includes scanning the imaging area including a second media to obtain optical data for a diffuse reflective map. The method also includes storing the specular reflectance map and the diffuse reflective map for adjusting actual pixel values during an imaging operation.

19 Claims, 4 Drawing Sheets

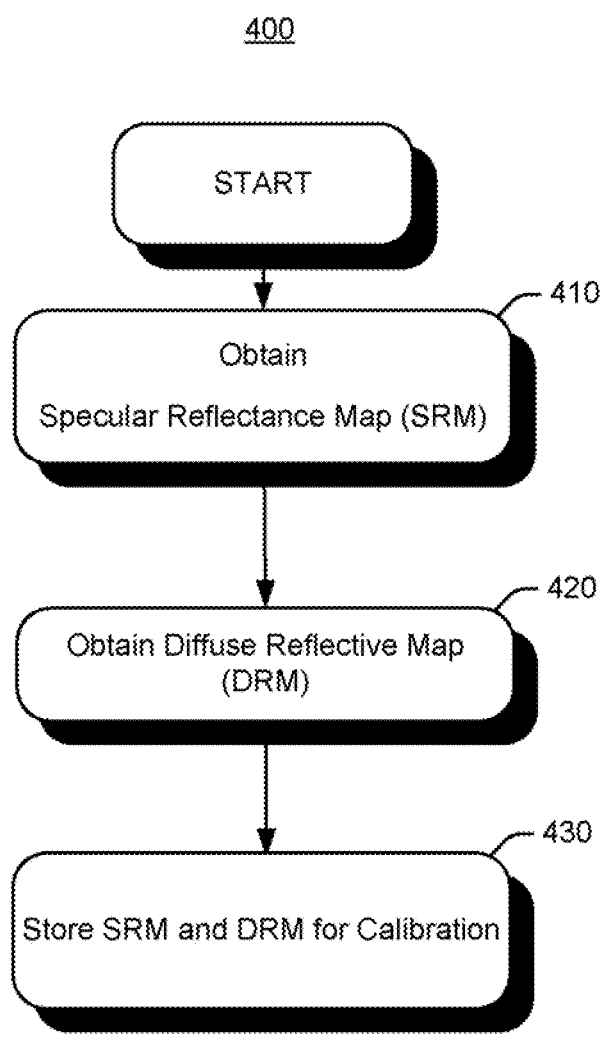

CALIBRATING FIELD UNIFORMITY

BACKGROUND

Imaging devices, such as scanners, copiers, facsimile machines, and multipurpose machines, are commercially available for converting tangible images (e.g., documents, photographs) into electronic images. These imaging devices operate by generating light from a light source in the imaging device and reflecting this light off of the surface of the tangible image. The reflected light is collected on an array of photosensitive elements (e.g., a charge coupled device (CCD)), which convert the reflected light into electronic signals representing the image.

More recently, imaging devices have been proposed that use a digital camera and an LED lamp. The camera is aimed at a document and the LED lamp illuminates the document for the camera. In order for the LED lamp to provide adequate light, as well as prevent stray light leaking out across the room, the LED is focused onto the platen. The focusing transforms the LED's Lambertian radiance into a cone. Low cost focusing mechanisms such as Fresnel lenses or back-reflectors form non-uniform cones. The non-uniformity can reach 50% and severely degrade image quality.

The focused light reflected off a document is both diffuse and specular. The diffuse hotspot causes lighter regions of captured documents to appear dirty and grey colored. The specular hotspot causes darker regions to be speckled and washed-out. Camera manufacturers typically calibrate the white and black non-uniformities of a sensor array. This "zonal correction" calibrates offset, gain, sensor shading, and optical lens falloff, but does not calibrate for illumination. Thus, in previous attempts to accommodate camera-based scanners, the user often becomes frustrated when the resulting scanned image does not meet their expectations.

BRIEF DESCRIPTION OF THE DRAWINGS

FIG. 4 is a flowchart illustrating exemplary operations which may be implemented to calibrate field uniformity.

DETAILED DESCRIPTION

Systems and methods to calibrate field uniformity during an imaging operation are disclosed. Camera-based document capture systems may use multiple diffuse lamps to physically prevent specular reflections. Diffuse lamps are necessarily bulky and expensive. Polarizing filters (with complimentary filters placed over the lamp and camera) may also be used to reduce specular reflections in document capture scenarios. But these filters add cost. Specular reflections may also be reduced by combining two images: an ambient light image and a lamp illuminated image. Each corresponding pixel of the two images is compared and each darker pixel transferred to the processed image. But this approach exaggerates shadows.

The systems and methods described herein may be implemented to calibrate field uniformity without the need for diffuse lamps and/or filters. During the calibration procedure, the imaging area including a first media may be scanned to obtain optical data for a specular reflectance map. For example, the first media may be predominantly black. The imaging area including a second media may be scanned to obtain optical data for a diffuse reflective map. For example, the second media may be predominantly white. The specular reflectance map and the diffuse reflective map may then be stored for later use. Subsequent processing operations may implement the specular reflectance map and the diffuse reflective map to adjust pixel values during later imaging operations.

The disclosed embodiments also enable document capture to employ a small and inexpensive LED lamp, even though these LED lamps produce considerably more glare than traditional bulky diffuse lamps. In addition to calibrating for illumination, the disclosed embodiments may also replace zonal correction and calibrate all sources of field non-uniformities internal to or external to the camera using a single calibration. For example, other sources of field non-uniformities may include those from the sensor, optics, lamp, and ambient light. A single step calibration such as this introduces less noise than multiple step calibration techniques.

In addition, the disclosed embodiments are extendable. That is, factory presets may be stored for different media and toner/ink combinations. Alternatively, or in addition to, a user can relatively easily generate his or her own calibrations with the user's own paper (e.g., white paper and paper coated with the user's own black toner/ink). These and other embodiments may be better understood with reference to the figures and corresponding discussion below.

Figure 1:
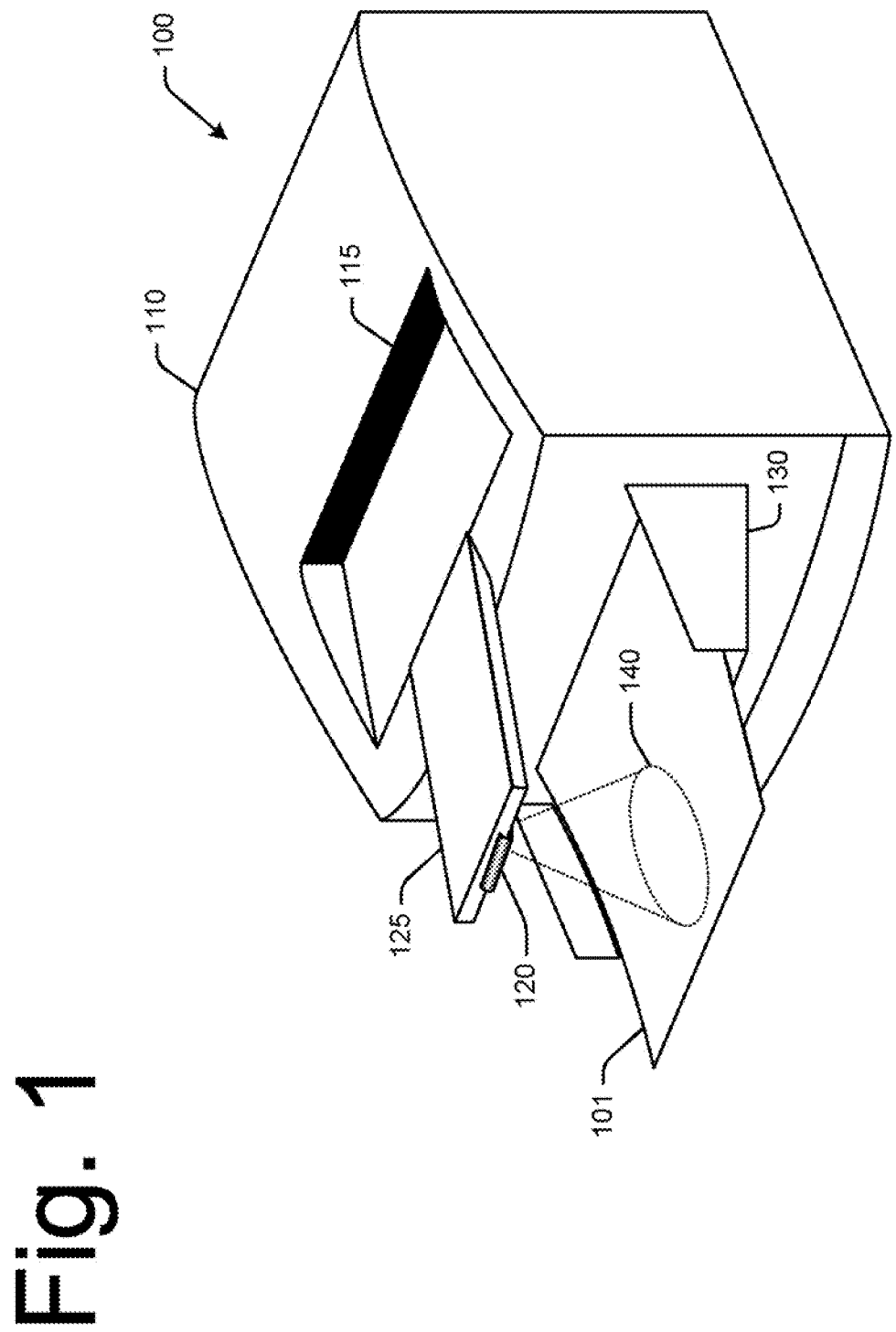
FIG. 1 is a perspective view of an exemplary imaging system which may be implemented to calibrate field uniformity.

FIG. 1 is a perspective view of an exemplary imaging system 100 which may be implemented to calibrate field uniformity. An exemplary imaging system 100 may be implemented as part of a printing device 110 configured with an imaging device 120, such as a light emitting diode (LED) light source and digital camera for image illumination and capture operations, respectively.

In an exemplary embodiment, imaging system 100 comprises a housing for the printing device 110. An imaging surface 130 may be provided in an exemplary configuration on the paper input tray to the printing device 110. The imaging device 120 (including the camera and light source) may be mounted over the imaging surface 130 such that light illuminates media 101 (e.g., a document to be imaged) placed on the imaging surface 130, as illustrated in FIG. 1 by dashed lines 140. For example, the imaging device 120 may be mounted on a paper guide 125 provided to collect printed media exiting port 115 in the printing device 110. In an exemplary embodiment, the light source and/or media 101 may be movable to better illuminate to media 101 to be imaged.

The light source may be an LED light source. The LED light source may include one or more LED lights or multiple LED lights. In exemplary embodiments, individual colored LED's may be individually strobed to achieve the desired RGB color exposure.

It will be readily appreciated that imaging device 120, such as the configuration shown in FIG. 1 and described above, may also be provided with various ancillary devices. For example, the imaging device may also be equipped with automatic document feeders, paper trays, I/O ports, output trays, LCD displays, and/or keypads to name only a few ancillary devices. These and other ancillary devices are commonly associated with imaging devices, and therefore are not shown or described herein as their description is not needed.

Although the systems and methods are described herein with reference to an imaging device 120 implemented with a printing device 110 for purposes of illustration, it is understood that the systems and methods are not limited to use with any particularly configuration of the imaging device 120. The systems and methods may be used in conjunction with any of a wide range of other types and configurations of devices that are now known or that may be developed in the future. For example, other embodiments may be implemented with handheld scanners, copiers, facsimile machines, multipurpose machines, digital image machines, and other electronic devices for capturing digital images.

To operate the imaging device 120, a user may position the media 101 to be imaged, scanned, or otherwise transferred into electronic form by any suitable means, on the imaging surface 130. In an exemplary embodiment, this involves positioning the media directly adjacent the imaging surface 130 beneath the light source. During operation, light originating at the light source is projected onto the media 101 being scanned, e.g., as illustrated by dashed lines 140. Light is reflected from the media 101 and onto photosensitive elements (e.g., provided in the digital camera). These photosensitive elements may be the same as those which already exist in conventional digital cameras for receiving light reflected off of an object being imaged. An arrangement of optional lenses and mirrors may also be provided to focus the light onto the photosensitive elements.

To calibrate field uniformity, the imaging area 130 including a first media 101 may be scanned to obtain optical data for a specular reflectance map. See, e.g., FIG. 2*a*. For example, the first media may be predominantly black and glossy. The imaging area 130 including a second media 101 may be scanned to obtain optical data for a diffuse reflective map. See, e.g., FIG. 2*b*. For example, the second media may be predominantly white and matte finish. The specular reflectance map and the diffuse reflective map may then be stored in computer readable memory (e.g., in the imaging system 100) for later use.

Although the calibration procedure may be implemented during manufacture, in an alternative embodiment, calibration media may be provided to the user. For example, the dark and white media may be provided permanently on opposites sides (black and white, respectively) on a cover of the imaging surface 130. Accordingly, the user can alternate sides of the cover being imaged to perform calibration in various lighting conditions. In another example, different patterns may be provided for different types of media, different types of imaging operations (e.g., color versus black-and-white), etc. In yet another alternative embodiment, no calibration media needs to be provided to the user and the user can generate their own calibration media, e.g., using the user's own paper stock and printing patterns using the user's own toner/ink.

Subsequent processing operations may then be implemented to automatically calibrate field uniformity of the media being imaged using the specular reflectance map and the diffuse reflective map. These and other aspects and operations will be described in more detail below with reference to examples of imaging operations.

Before continuing, however, it is noted that imaging devices and the operation of these devices in general is understood and therefore further description is not necessary for a full understanding of, or to practice the systems and methods disclosed herein. It is also noted that the specific configurations shown and described herein are only illustrative and exemplary and are not intended to be limiting. Other configurations are also contemplated and may depend on various design considerations, user preferences, etc.

By way of further illustration, as used in this document, the terms "scan" and "scanning" include operations which may be accomplished by any flatbed scanning device in which the scan module(s) or other capture device moves past a stationary document or other scan object, sheet feed scanning in which the scan object moves past the capture device, and other image/object capture techniques and devices whether or not the capture device and the scan object move relative to one another. Furthermore, the terms "scan" and "scanning" also include a "still photo" provided by a stationary camera or other imaging device using a stationary lamp (e.g., LED).

Figure 2A:
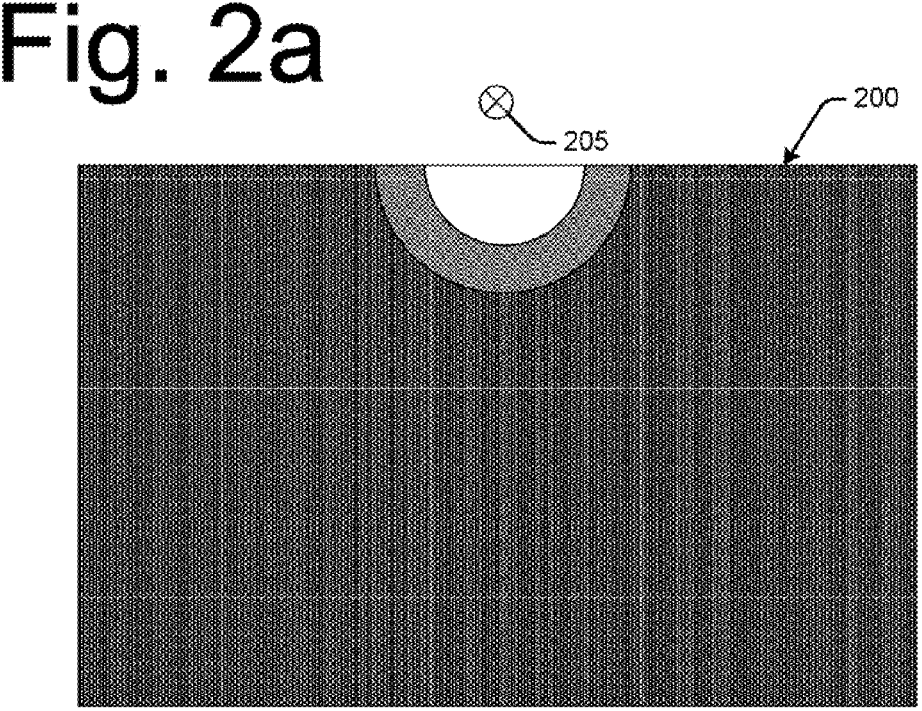
FIGS. 2a-b is illustrative of (a) a specular reflectance map obtained by capturing optical data for predominantly black media positioned adjacent an imaging device for calibrating field uniformity; and (b) a diffuse reflectance map obtained by capturing optical data for predominantly white media positioned adjacent an imaging device for calibrating field uniformity.
Figure 2B:
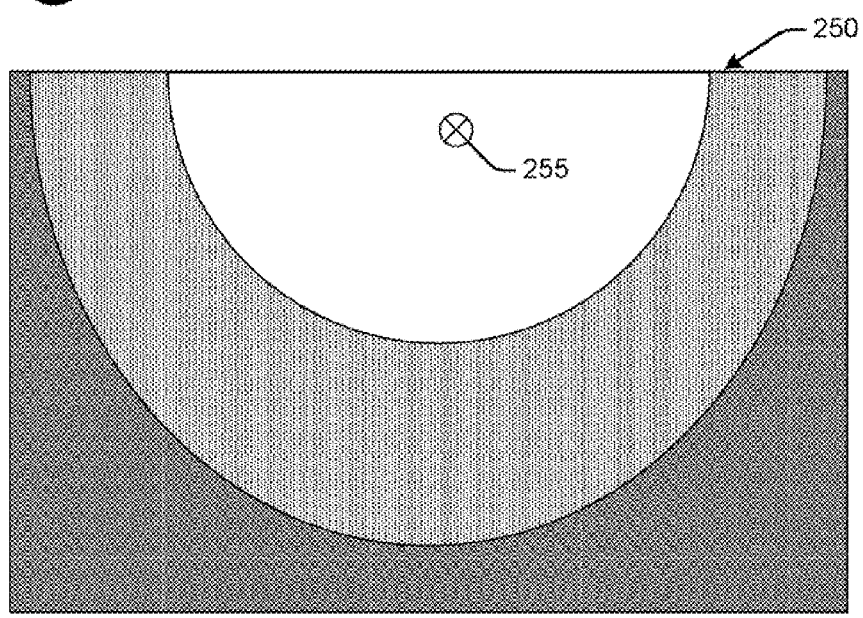

FIGS. 2*a*-*b* is illustrative of (*a*) a specular reflectance map obtained by capturing optical data for predominantly black and glossy media positioned adjacent an imaging device for calibrating field uniformity; and (*b*) a diffuse reflectance map obtained by capturing optical data for predominantly white and matte finish media positioned adjacent an imaging device for calibrating field uniformity.

The focused light reflected off a media 101 is both diffuse and specular. FIG. 2*a* is the corresponding specular reflectance map. FIG. 2*b* is a typical diffuse reflectance map. Note that the hotspots in the maps, represented by target 205 and 255, respectively, do not align. The specular hotspot 205 causes darker regions of captured documents to be speckled and washed-out. The diffuse hotspot 255 causes lighter regions to appear dirty and grey colored or washed-out. The calibration technique performs pixel-by-pixel dynamic range stretching between the diffuse and specular reflectance maps. The maps may be a factory calibration or generated by an operator.

Other input may also be used for calibrating field uniformity, such as, but not limited to, factory-configured and/or user-configured settings, and other information about the media (e.g., paper type and/or image content), lighting conditions (artificial and/or natural light), etc.

It is also noted that after calibrating the imaging surface, a border may be defined by cropping edges from the resulting images so that only those portions which can be accurately calibrated are used for imaging operations.

Figure 3A:
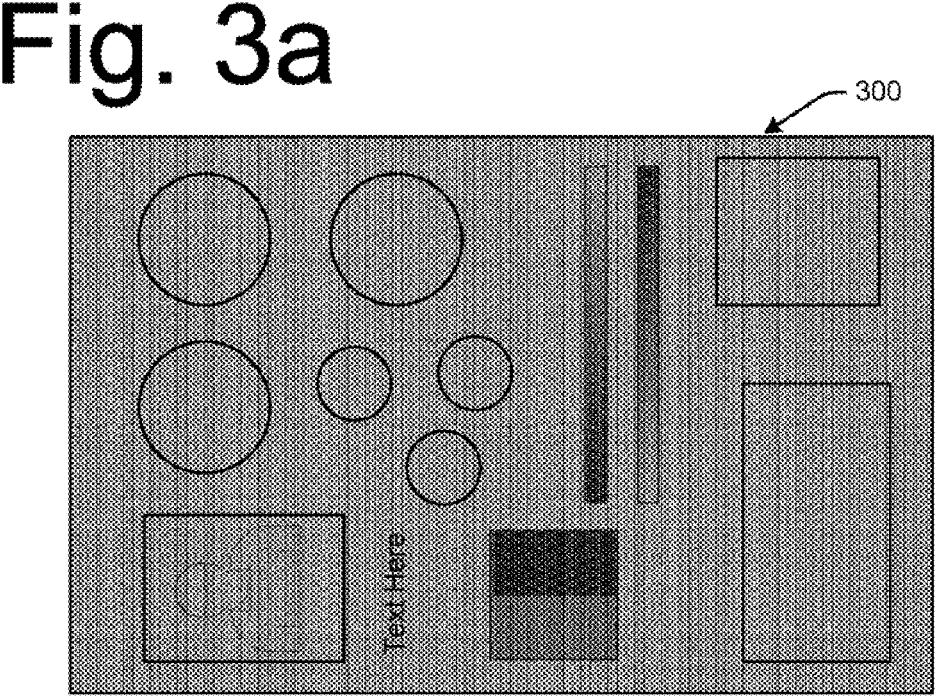
FIGS. 3a-b is a plan view of a scanned image showing (a) an un-calibrated image; and (b) an image calibrated for field uniformity.
Figure 3B:
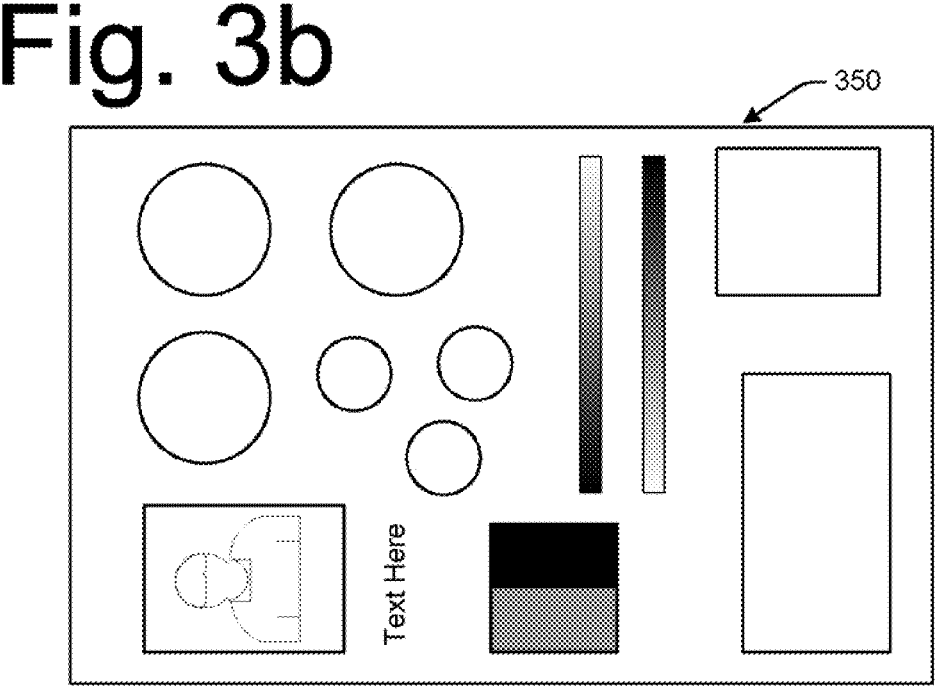

FIGS. 3*a*-*b* is a plan view of a scanned image showing (*a*) an un-calibrated image 300; and (*b*) an image 350 calibrated for field uniformity. That is, the image 300 may be illuminated by the LED light source and have the reflectance profiles shown in FIGS. 2*a*-*b*. The same image 350 corrected based on the calibration procedure is shown in FIG. 3*b*. It can be seen by comparison of images 300 and 350 that the method removes both diffuse and specular hotspots.

It is noted that although specific media sizes and orientations are shown in FIGS. 2*a*-*b* and 3*a*-*b*, any size media may be used in any orientation. Indeed, it will be readily apparent to those having ordinary skill in the art after becoming familiar with the teachings herein, that any number, size, shape, and orientation of media 101 may be implemented for the calibration techniques and imaging operations described herein. For example, a larger media will generally result in greater accuracy in calibrating the entire imaging surface. A smaller media will generally result in less accuracy in calibrating the entire imaging surface, but at faster processing times.

FIG. 4 is a flowchart illustrating exemplary operations which may be implemented to calibrate field uniformity. Operations 400 may be embodied as logic instructions on one or more computer-readable medium in the imaging device.

When executed on a processor, the logic instructions implement the described operations. In an exemplary embodiment, the components and connections depicted in the Figures may be used.

In operation 410, the imaging area is scanned to obtain optical data for a specular reflectance map. In operation 420, the imaging area is scanned to obtain optical data for a diffuse reflective map. Typically, operations 410 and 420 include obtaining image data by scanning the entire imaging surface. However, these operations may also be implemented in a dynamic manner, wherein one or more area is scanned at a time and then processed. Based on the processing, the imaging operation may continue or abort.

In another exemplary embodiment, optical data from the imaging operation may be processed in real-time during the imaging operation, and at least a portion of a light source used for the imaging operation is inactivated when no longer needed (e.g., for energy savings).

In operation 430, the specular reflectance map and the diffuse reflective map may be stored and used to adjust actual pixel values during a subsequent imaging operation. By way of example, the specular reflectance map and the diffuse reflective map may be applied in a mathematical function to adjust actual pixel values for the imaging operation.

An exemplary mathematical function which may be utilized for subsequent imaging operations is:

$$C_i = \text{MAX}\left(0, \text{MIN}\left(b^2 - 1, (A_i - S_i)\left[\frac{b^2 - 1}{(D_i - S_i)}\right]\right)\right)$$

where:
$D_i$ is the ith pixel in the diffuse reflectance map;
$S_i$ is the ith pixel in the specular reflectance map;
$A_i$ is the ith pixel in an image to be processed by the imaging operation;
b is bit depth of the image; and
$C_i$ is the ith pixel in the processed image.

It is noted that in the function defined above, the MIN and MAX functions serve to "clamp" the adjusted pixels inside the original dynamic range. Adjusted pixels may exceed the range in the presence of noise or extreme glare.

In an exemplary embodiment, S and D may be noise reduced and smoothed before applied to A. Also in an exemplary embodiment, S and D may be defined as at least one of low-resolution images or as 2-dimensional functions. Also in exemplary embodiments, S and D may predefined as a factory calibration. Of course, S and D may also be generated by a user (in addition to, or instead of, factory calibration) to reduce glare and shadows based at least in part on actual lighting conditions.

Although the calibration procedure has been described in detail with reference to a grayscale version of the disclosed method, it will be readily appreciated by those having ordinary skill in the art after becoming familiar with the teachings herein that the calibration can be readily extended to one or more channel of a color image.

Before continuing, it is noted that the mathematical function described above is provided only for purposes of illustration and is not intended to be limiting. For example, data is not limited to being processed by this mathematical function and other functions (linear or non-linear) may also be implemented. In addition, the calibration may also utilize data expressed in any suitable data structure(s) (e.g., plots, tables, etc.) and processed using suitable models and/or data processing techniques.

The operations shown and described herein are provided to illustrate exemplary embodiments of calibrating field uniformity. It is noted that the operations are not limited to the ordering shown. In addition, operations may terminate and/or restart at any point in time.

It is noted that the exemplary embodiments shown and described are provided for purposes of illustration and are not intended to be limiting. Still other embodiments are also contemplated.

The invention claimed is:

1. A method of calibrating field uniformity, comprising:
scanning the imaging area including a first media to obtain optical data for a specular reflectance map;
scanning the imaging area including a second media to obtain optical data for a diffuse reflective map, wherein pixels in the diffuse reflectance map and pixels in the specular reflectance map are generated by a user to reduce glare and shadows based at least in part on actual lighting conditions; and
storing the specular reflectance map and the diffuse reflective map to adjust actual pixel values for an imaging operation.

2. The method of claim 1, wherein the first media is covered with toner.

3. The method of claim 1, wherein the first media includes color toner.

4. The method of claim 1, wherein the first media is predominantly black.

5. The method of claim 1, wherein the second media is plain paper without any toner.

6. The method of claim 1, wherein the second media is predominantly white.

7. The method of claim 1, wherein the first media and second media are substantially the same except for those characteristics varied in the first media to obtain the specular reflectance map and those characteristics varied in the second media to obtain the diffuse reflective map.

8. The method of claim 1, further comprising using the specular reflectance map and the diffuse reflective map in a mathematical function to adjust actual pixel values for the imaging operation.

9. The method of claim 8, wherein the mathematical function is:

$$C_i = \text{MAX}\left(0, \text{MIN}\left(b^2 - 1, (A_i - S_i)\left[\frac{b^2 - 1}{(D_i - S_i)}\right]\right)\right)$$

where:
$D_i$ is the ith pixel in the diffuse reflectance map;
$S_i$ is the ith pixel in the specular reflectance map;
$A_i$ is the ith pixel in an image to be processed by the imaging operation;
b is bit depth of the image; and
$C_i$ is the ith pixel in the processed image.

10. The method of claim 1, wherein the pixels in the diffuse reflective map and the pixels in the specular reflectance map are initially predefined as a factory calibration.

11. A system of calibrating field uniformity, comprising:
an imaging area;
a light source and light detector configured to scan the imaging area including media to be scanned and to obtain a specular reflectance map and a diffuse reflective map wherein pixels in the diffuse reflective map and pixels in the specular reflectance map are noise reduced and smoothed before applied to pixels in an image to be processed by the imaging operation; and computer readable storage configured to store the specular reflectance map and the diffuse reflective map for adjusting optical data during later imaging operations.

12. The system of claim 11, wherein the light source is a light emitting diode (LED) light.

13. The system of claim 11, wherein the light detector is a digital camera.

14. The system of claim 11, further comprising a processor operatively associated with the computer readable storage, the processor executing program code to adjust the specular reflectance map and the diffuse reflective map during later imaging operations using a mathematical function.

15. The system of claim 14, wherein the mathematical function is:

$$C_i = \text{MAX}\left(0, \text{MIN}\left(b^2 - 1, (A_i - S_i)\left[\frac{b^2 - 1}{(D_i - S_i)}\right]\right)\right)$$

where:
$D_i$ is the ith pixel in the diffuse reflective map;
$S_i$ is the ith pixel in the specular reflectance map;
$A_i$ is the ith pixel in an image to be processed by the imaging operation;
b is bit depth of the image; and
$C_i$ is the ith pixel in the processed image.

16. The system of claim 11, wherein pixels in the diffuse reflective map and pixels in the specular reflectance map are defined as at least one of low-resolution images or as 2-dimensional functions.

17. The system of claim 11, wherein pixels in the diffuse reflectance map and pixels in the specular reflectance map are generated by a user to reduce glare and shadows based at least in part on actual lighting conditions.

18. A system for calibrating field uniformity, comprising:
LED lighting means and camera means for scanning an imaging area including media to be scanned to obtain a specular reflectance map and a diffuse reflective map;
means for storing the specular reflectance map and the diffuse reflective map;
means for adjusting optical data during later imaging operations based on the stored specular reflectance map and the diffuse reflective map; and
wherein pixels in the diffuse reflective map and pixels in the specular reflectance map are defined as at least one of low-resolution images or as 2-dimensional functions.

19. The system of claim 18, wherein the means for adjusting optical data is at least in pan by using the following mathematical function:

$$C_i = \text{MAX}\left(0, \text{MIN}\left(b^2 - 1, (A_i - S_i)\left[\frac{b^2 - 1}{(D_i - S_i)}\right]\right)\right)$$

where:
$D_i$ is the ith pixel in the diffuse reflectance map;
$S_i$ is the ith pixel in the specular reflectance map;
$A_i$ is the ith pixel in an image to be processed by the imaging operation;
b is bit depth of the image; and
$C_i$ is the ith pixel in the processed image.

* * * * *

UNITED STATES PATENT AND TRADEMARK OFFICE
CERTIFICATE OF CORRECTION

PATENT NO. : 8,649,076 B2
APPLICATION NO. : 12/512934
DATED : February 11, 2014
INVENTOR(S) : Peter Majewicz Page 1 of 1

It is certified that error appears in the above-identified patent and that said Letters Patent is hereby corrected as shown below:

In the Claims:

In column 8, line 18, in Claim 19, delete "pan" and insert -- part --, therefor.

Signed and Sealed this
Twenty-seventh Day of May, 2014

Michelle K. Lee
*Deputy Director of the United States Patent and Trademark Office*